United States Patent
Suckow

[11] 3,751,069
[45] Aug. 7, 1973

[54] TRAILER HITCH HAVING A STABILIZING MECHANISM
[76] Inventor: Theodore K. Suckow, 160 Rock Rd., Glen Rock, N.J. 07452
[22] Filed: Mar. 6, 1972
[21] Appl. No.: 231,938

[52] U.S. Cl. .......................................... 280/406 A
[51] Int. Cl. ...................... B62d 53/00, B62d 1/06
[58] Field of Search .................................. 280/406

[56] References Cited
UNITED STATES PATENTS

| | | | |
|---|---|---|---|
| 2,597,657 | 5/1952 | Mathisen | 280/406 |
| 3,700,261 | 10/1972 | Suckow | 280/406 |
| 3,700,262 | 10/1972 | Suckow | 280/406 |
| 2,808,272 | 10/1957 | Reese | 280/406 |
| 3,206,224 | 9/1965 | Bock | 280/406 |
| 3,552,771 | 1/1971 | Hendricks | 280/406 |

Primary Examiner—Leo Friaglia
Assistant Examiner—J. D. Rubenstein
Attorney—Arthur Frederick

[57] ABSTRACT

The trailer hitch stabilizing mechanism has an elongated bar assembly wherein each bar is pivotally secured at one end to the tractive vehicle and, at its opposite distal end portion, connected to the frame of the trailer so that, upon endwise axial movement of the bar relative to the trailer frame, the bar causes a horizontal, stabilizing force to be exerted on the trailer frame. The mechanism includes, in combination with the elongated bar assembly, locking means coacting with each elongated bar assembly to render the bar, as desired, operative or inoperative with respect to exerting a horizontal stabilizing force. A control means for selectively actuating the locking means to effect operativeness and inoperativeness of the elongated bar assemblies is provided at a location remote from the locking means.

18 Claims, 13 Drawing Figures

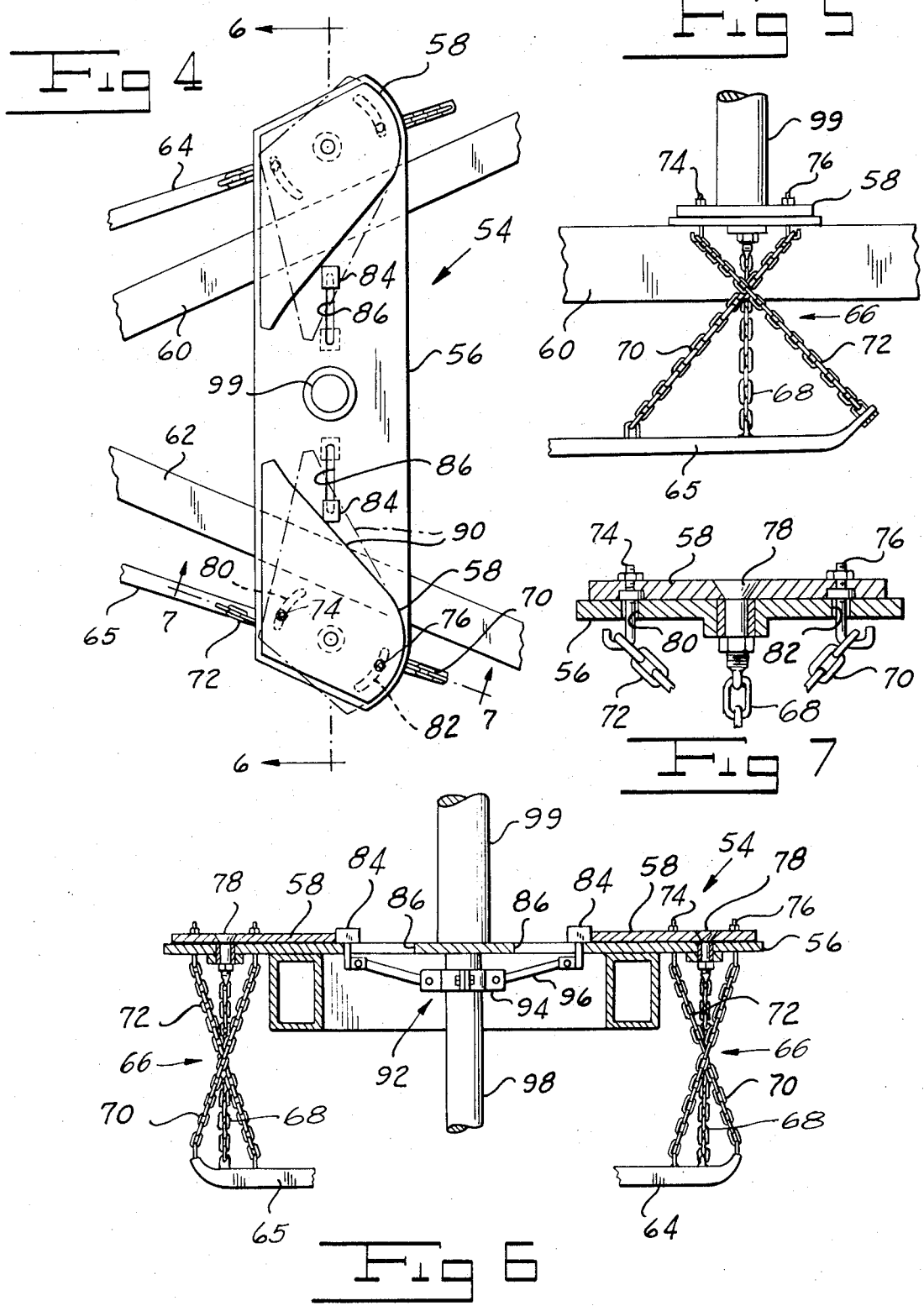

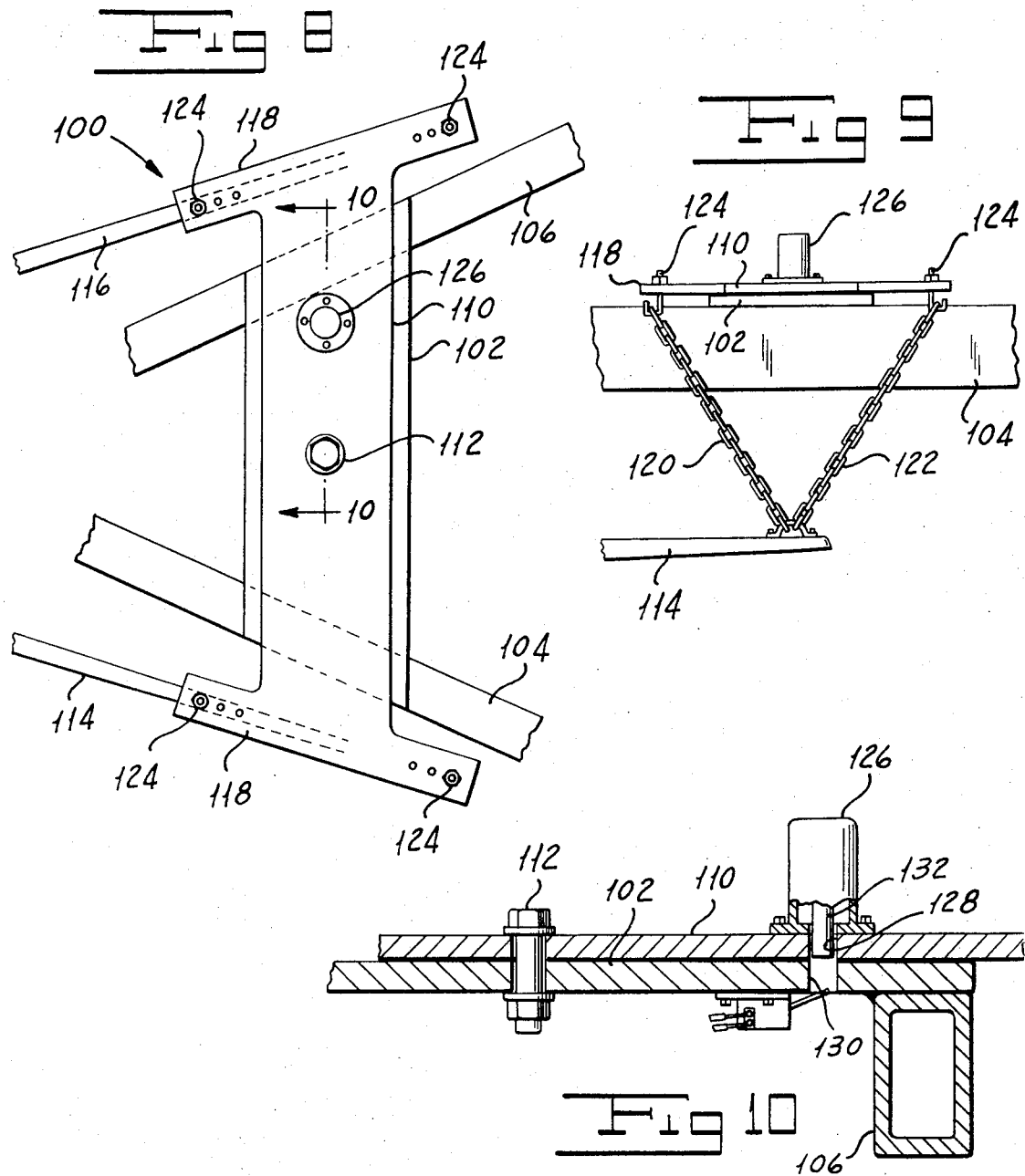

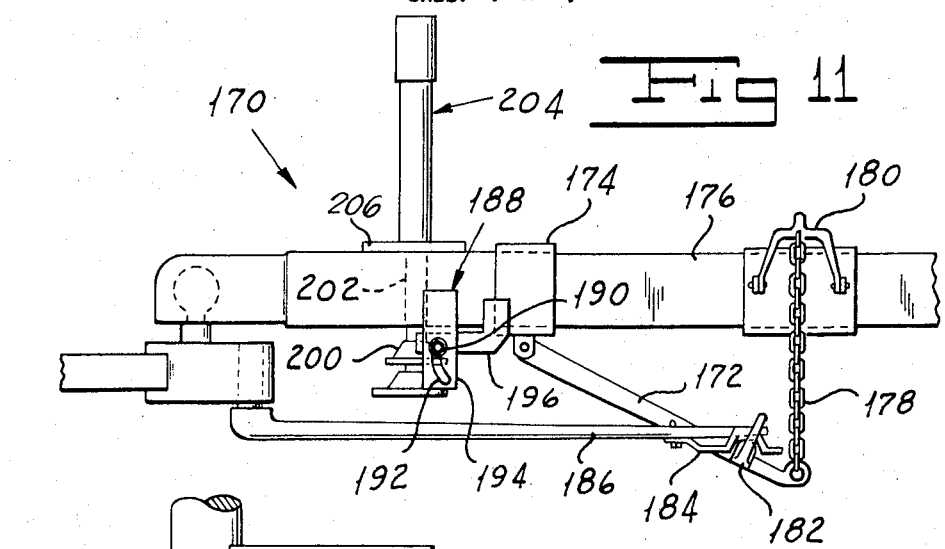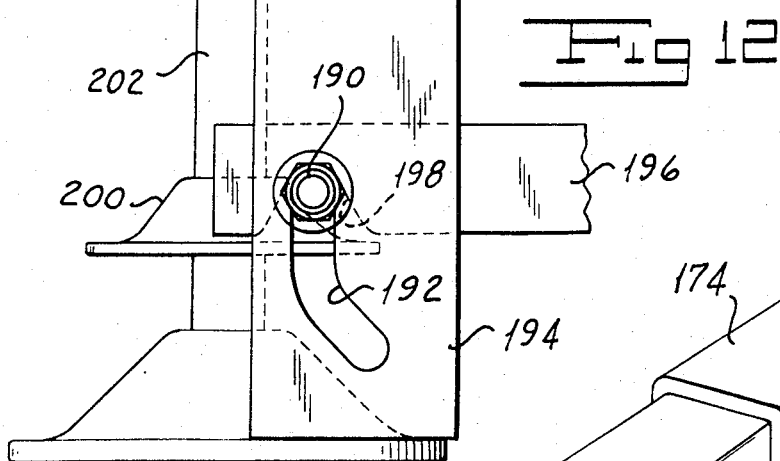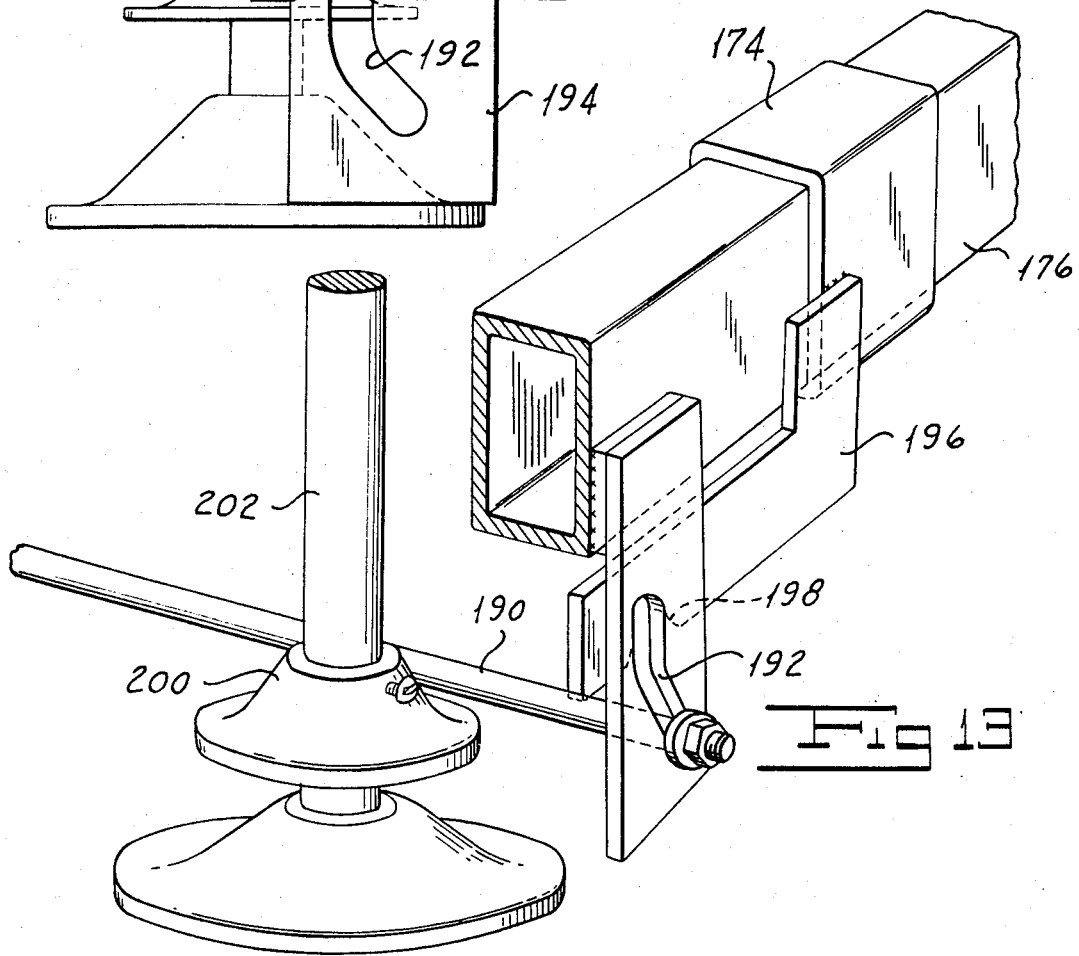

3,751,069

TRAILER HITCH HAVING A STABILIZING MECHANISM

This invention relates to trailer hitches and, more particularly, to trailer hitches having a stabilizing mechanism and may also include load equalizing means.

BACKGROUND OF THE INVENTION

As exemplified in the U.S. Pat. to Mathisen, No. 2,597,657; Reese, No. 3,185,499; Reese, No. 3,194,584; Bock et al., No. 3,206,224; and Hendricks, No. 3,552,771, trailer hithces commonly include stabilizing and load equalizing mechanisms which comprise elongated bars pivotally connected to the tractive vehicle and extending rearwardly adjacent each of the diverging frame members of the trailer "A" frame, the distal end portion of the bars being connected to the adjacent frame member so as to provide horizontal resistance when the tractive vehicle and trailer move out of the straight towing alignment as in a turn. In some stabilizing mechanisms the elongated bars are resilient and undergo flexure at the same time as providing horizontal resistance, such as shown in the U.S. Pat. No. to Bock et al., 3,206,224, or are rigid bars, such as shown in the U.S. Pat. No. to Reese, 2,808,272. The distal ends of either the rigid or resilient bars are usually connected to the trailer "A" frame member through a saddle, bracket or other support which is suitably connected in a fixed location on the frame members by bolts, clamps or other fastening devices. While these mechanisms provide resistance to sway and fishtailing and hence provide stabilization, such mechanisms limit the sharpness of turns which can be made by the tractive vehicle and the towed trailer (hereinafter referred to as the "rig"). At low speed operation, as for example 30 MPH and below, when stabilization is less desirable, the stabilizing mechanism is more of a detriment than benefit by reducing maneuverability of the rig, particularly in rearwardly directed maneuvering. Thus, conventional stabilizing mechanisms cause unnecessary strain on the frames of the tractive vehicle and trailer and undue wear of their tires. These disadvantages of heretofore known stabilizing and/or equalizing mechanisms is overcome by the present invention by providing an improved trailer hitch stabilizing and/or load equalizing mechanism which is capable of rendering the stabilizing function operative or inoperative from a point remote from the trailer hitch.

Accordingly, it is an object of this invention to provide a trailer hitch stabilization mechanism which is capable of being rendered operative or inoperative from a point remote from the trailer hitch.

Another object of the present invention is to provide a trailer hitch stabilizing mechanism which does not impose undue strain or wear on the frames and tires of the tractive vehicle and trailer and which does not hamper the rearward maneuverability of the tractive vehicle and trailer.

A further object of this invention is to provide a trailer hitch stabilizing mechanism which can be locked to and unlocked from the trailer "A" frame at the will of the operator of the tractive vehicle.

A still further object of the present invention is to provide a trailer hitch stabilization mechanism which is made effective at high speed operation and ineffective at low speed operation while driving.

SUMMARY OF THE INVENTION

Now, therefore, the present invention contemplates an improved trailer hitch stabilizing mechanism comprising, in combination with means for pivotally interconnecting the "A" frame of the trailer with the tractive vehicle, at least one elongated bar (hereinafter referred to as a "resistance bar") pivotally connected at one end to the tractive vehicle and extending adjacent and below each of the "A" frame members, and connecting means for connecting the distal end portion of the resistance bar to the "A" frame member. The mechanism includes locking means coacting with the "A" frame member and the connecting means to fixedly secure the latter to the "A" frame member in one operative position so that the resistance bar provides horizontal resistance to restrain fishtailing or sway upon axial endwise movement of the resistance bar relative to the "A" frame member and, in another operative position, releases the connecting means so that the resistance bar does not provide horizontal resistance upon axial endwise movement relative to the "A" frame. A control means is located at a point remote from the locking means, but connected to the locking means to effect actuation of the latter to the two operative positions and, thus selectively rendering the resistance bar operative or inoperative, as desired.

BRIEF DESCRIPTION OF THE DRAWINGS

The invention will be more fully understood from the following detailed description thereof, when considered in connection with the accompanying drawings, wherein several embodiments of the invention are illustrated and in which:

FIG. 4 is a fragmentary plan view of a trailer hitch and equalizing and stabilizing mechanism according to a second embodiment of this invention;

FIG. 5 is a fragmentary side elevational view of the mechanism shown in FIG. 4;

FIG. 6 is a view in cross section taken along line 6—6 of FIG. 4;

FIG. 7 is a cross-sectional view taken along line 7—7 of FIG. 4 on a somewhat enlarged scale;

FIG. 8 is a trailer hitch load equalizing and stabilizing mechanism according to a third embodiment of the present invention;

FIG. 9 is a fragmentary side elevational view of the mechanism shown in FIG. 8;

FIG. 10 is a fragmentary cross-sectional view taken along line 10—10 of FIG. 8;

FIG. 11 is a side elevational view of a trailer hitch load equalizing and stabilizing mechanism according to a fourth embodiment of this invention;

FIG. 12 is a fragmentary elevational view on an enlarged scale showing locking means for this mechanism; and FIG. 13 is a perspective view of the mechanism shown in FIGS. 11 and 12.

DESCRIPTION OF PREFERRED EMBODIMENTS

Figure 1:
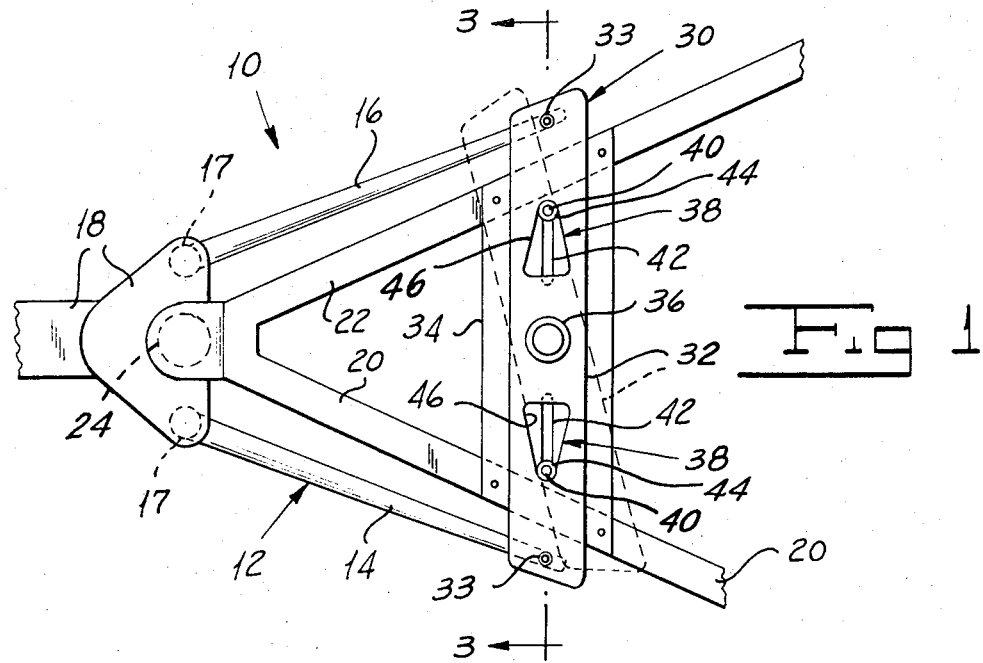
FIG. 1 is a plan view of a trailer hitch load equalizing and stabilizing mechanism according to a first embodiment of this invention.
Figure 2:
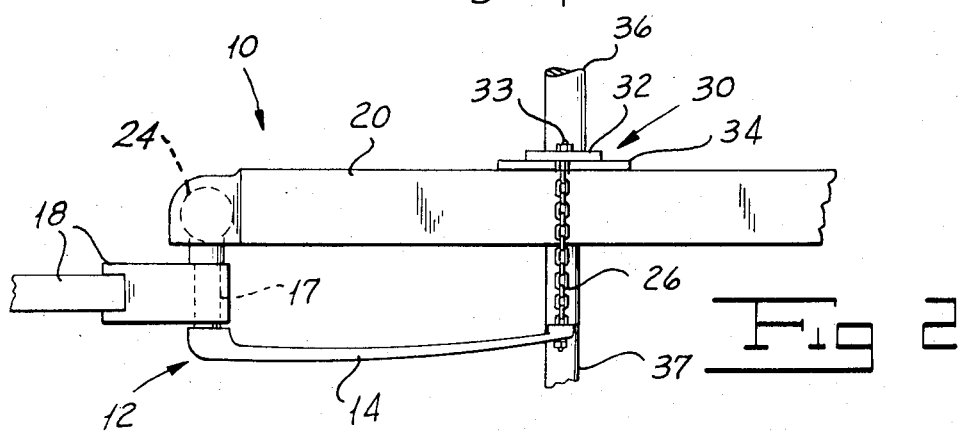
FIG. 2 is a side elevational view of the mechanism shown in FIG. 1.
Figure 3:
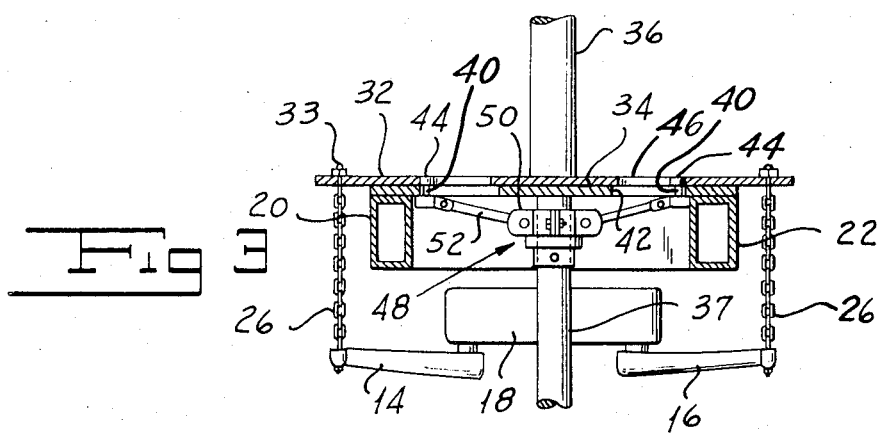
FIG. 3 is a cross-sectional view taken along line 3—3 of FIG. 1.

Now referring to the drawings and specifically FIGS. 1 to 3, the reference number 10 designates the trailer hitch stabilizing and load equalizing mechanism according to a first embodiment of this invention. The mechanism 10 comprises a resistance bar assembly 12 of the type shown in the U.S. Pat. to Mathisen, No. 2,597,657 and Reese, No. 3,185,499 in which the resistance bars undergo flexure. The resistance bar assembly 12 consists of two spring bars 14 and 16 each of which is pivotally connected at 17 to a bracket 18 secured to the frame (not shown) of a tractive vehicle (not shown). The spring bars 14 and 16 extend, from pivotal connections at 17, adjacent and below "A" frame members 20 and 22, respectively, of a trailer "A" frame which is connected to bracket 18 through a ball and socket connection 24. The distal end portion of each spring bar 14 and 16 is connected to its associated "A" frame member by a tensioning cable or chain 26, which is connected, at one end, to the spring bar and, at the opposite end, to a connecting means 30 according to this invention.

The connecting means 30 comprises a plate 32 which is mounted on a bracket 34. The bracket 34 is dimensioned to extend between "A" frame members 22 and 20 and are secured to the "A" frame members in any suitable way as by bolts, welding or the like. A conventional trailer jack 36, such as the Lectra Jack manufactured by Reese Products Inc. of Elkhart, Indiana, is mounted on bracket 34 and serves as a pivot post for plate 32. The plate 32 is dimensioned to extend beyond "A" frame members 22 and 20 to overlie the distal end portions of spring bars 14 and 16. The chains 26 are each secured at one end in any suitable manner to the distal end portions of the associated spring bar and at the opposite end to the opposite end portions of plate 32 by connections 33.

To provide for load equalization or distribution, chains 26 may be dimensioned in relation to the location of plate 32 on the "A" frame to place spring bars 14 and 16 under flexure and hence a preselected tension.

To prevent pivotal movement of plate 32 relative to bracket 34, a locking means is provided. The locking means includes a pair of pins and slot assemblies 38 each of which comprises a pin 40 slidably mounted within an elongated opening or guide slot 42 in bracket 34 and having a head portion 44 which rides within a tapered slot 46 in plate 32. Each tapered slot 46 is tapered so that its widest end is nearest the pivot or jack 36. With each pin 40 in the outermost position and the narrow end of its associated tapered slot 46, plate 32 is prevented from pivoting about jack 36. In this locked position spring bars 14 and 16 will function, through chains 26, to exert an increased downward force on "A" frame members 20 and 22, as well as horizontal resistance on both sides of the trailer "A" frame when the rig moves out of straight in-line towing relation, as in a turn, and spring bars 14 and 16 move endwise relative to the "A" frame members. This function achieves stabilization of the rig by resisting fishtailing or sway. With pins 40 slid to the inner end of slots 46, plate 32 is free to pivot within the limits defined by the wide end of slots 46 as shown by the dot-dash lines.

As best shown in FIG. 3, to selectively control the position of pins 46 in their associated slots 46 and thereby lock and unlock plate 32, a control means 48, is provided. The control means 48 comprises a split collar 50 which is secured to the telescopically extensile and retractile post 37 of jack 36 and links 52 which are pivotally connected at opposite ends to the collar 50 and to pins 40. Obviously, movement of post 37 of jack 36 in a direction away from bracket 32, as viewed in FIG. 3, carries collar 50, in the downward direction, thus slidably drawing pins 40 in guide slots 42 toward the wide, inner ends of tapered slots 46. With the pins 40 at the wide, inner ends of tapered slots 46, plate 32 is free to pivot about jack 36. When plate 32 is free to pivot, under the urging of spring bars 14 and 16 as they move endwise relative to "A" frame members 20 and 22, the spring bars are not flexed and no increased downward force or horizontal force is exerted on the "A" frame members. In this unlocked position, the stabilization function is ineffective, strain on the frames of the tractive vehicle and trailer is minimized and the rig is easier to maneuver at low speeds, particularly in a rearward direction as in parking.

The actuation of jack 36 to extend or retract post 37 of the jack can be accomplished by an electric control switch located at the trailer hitch and/or on the instrument panel of the tractive vehicle so that locking and unlocking of the spring bars 14 and 16 can be accomplished while the rig is being driven. This latter mentioned control switch permits the spring bars to be rendered inoperative for effecting stabilization at low speed operation and, as is usually desired, the rendering of the spring bars operative for effecting stabilization during high speed driving without the necessity of stopping the rig.

Suitable limit switches or other stop means and override switches may be provided so that the jack post 37 is only extended a distance sufficient to release plate 32 for pivotal movement and prevent the post, while the vehicle is driven, from being extended to the road surface.

In FIGS. 4 to 7 is shown a trailer hitch stabilizing and load equalizing mechanism 54 according to a second embodiment of the present invention. The mechanism 54 differs essentially from the mechanism 10 shown in FIGS. 1 to 3, in that instead of one pivotal plate to which the spring bars are attached, two pivotal plates are provided. Also, mechanism 54 is shown as having two tethering chains or cables instead of one for connecting each of the spring bars to the trailer frame, but the mechanism is not limited thereto and may have any tethering assembly.

As shown, mechanism 54 comprises a bracket 56, similar to bracket 34 of mechanism 10, which is secured in any suitable way to "A" frame members 58 and 60. The bracket is dimensioned in length to overhang at opposite ends "A" frame members 58 and 60 and overlie the distal end portions of spring bars 62 and 64. To each overhanging end portion of bracket 56 is pivotally mounted a plate 58 to which each spring bar 62 and 64 is connected through tethering assemblies 66. Since both plates 58 and their function is identical, only one will be described.

As best shown in FIGS. 4, 5 and 7, tethering assemblies 66 comprise a single vertically extending chain 68 and two chains 70 and 72 extending in opposite, inclined directions to form an "X" pattern (see FIG. 5). The chain 72 is connected, at one end, to the distal end portion of spring bar 62 and, at the opposite end, is connected through a "J" bolt 74, to pivotal plate 58. The chain 70 is connected at one end to spring bar 62 at a point inwardly of the distal end and, at the opposite end, to a "J" bolt 76 carried by pivotal plate 58. The chain 68 is connected at one end in alignment with the pivot pin assembly 78 by which plate 58 is pivotally connected to bracket 56. The opposite end of chain 68 is secured to spring bar 62, the chain being adjusted to provide spring bar 62 with a predetermined flexure and, hence, effect distribution of the trailer load on the tractive vehicle.

The "J" bolts 74 and 76 each extend through arcuate slots 80 and 82, respectively, in bracket 56 so that plate 58 can pivot about pivot pin assembly 78 as shown by the dot-dash lines in FIG. 4. The "J" bolts 74 and 76 are offset on either side of a vertical plane in which the longitudinal axis of the spring bar 62 is located so that chains 70 and 72, through their connection with "J" bolts 76 and 74, impose a clockwise directed torque force on plate 58 as the plate is viewed in FIG. 4. To prevent pivotal movement of plate 58 and thereby lock plate 58 to bracket 56, a locking means is provided.

Since the preset tension for load distribution is provided by chains 68, chains 70 and 72 are not under load except when functioning to provide horizontal resistance. Thus, the frictional forces between plates 58 and bracket 56 is minimal. However, to facilitate rotative movement of plates 58 on bracket 56, bearing means (not shown) or other conventional anti-friction devices well-known to those skilled in the art may be incorporated in mechanism 54.

The locking means comprises a stop pin 84 which is mounted for slidable movement in an elongated opening or slot 86. As best shown in FIG. 6 stop pin 84 has a head portion which abuts a camming edge portion 90 of plate 58, the camming edge portion 90 extending at an angle with respect to the line of extension of slot 86.

To selectively control the position of stop pins 84 in their associated slots 86, a control means 96, similar to control means 48 of mechanism 10, is provided. As in mechanism 10, stop pins 84 are each connected to a collar 94 by links 96, the collar being secured to the movable post 98 of jack 99, such as an electrically powered jack. The operation of the electric jack may be controlled by a switch located in the tractive vehicle so that, while the tractive vehicle is being driven, post 98 of the jack may be extended or retracted. Suitable limit switches and override switches may be provided as described for mechanism 10 so that the jack post 98 is only extended a distance sufficient to release plates 58 for pivotal movement and prevent the post, while the vehicle is driven, from being extended to the road surface.

In operation of mechanism 54 to render spring bars 65 and 64 inoperative for stabilization, jack 100 is actuated to extend post 98 thereby drawing stop pins 84 in slots 86 inwardly toward jack 99 and away from camming edges 90 of plates 58. With the stop pins 84 withdrawn from engagement with plates 58, plates 58 are thus free to rotate about pivot assembly 78. When plates 58 are free to pivot, the tension which tends to be exerted on chains 70 and 72 upon movement of the tractive vehicle and trailer out of straight line alignment is absorbed by pivotal movement of plates 58 and thus spring bars 65 and 64 do not offer horizontal resistance. To restore the stabilization operativeness of spring bars 65 and 64, the post 98 of jack 99 is retracted thereby forcing stop pins 84 outwardly in their slots 86 against camming edges 90 of plate 58. This is preferably accomplished when the tractive vehicle and trailer are in straight in-line towing relationship. Each of the plates 58 may be biased in a locked direction by any suitable means, such as a spring (not shown), to assist the camming action of pins 84 in rotating plates 58. When the stop pins 84 are fully extended plates 58 are again held against rotation by the torque force exerted on plates 58 by chains 70 and 72. Thus, with plates 58 held stationary, axial endwise movement of spring bars 65 and 64 relative to "A" frame members 58 and 60 results in the spring bars exerting horizontal forces we well as increased downward forces on the rig frames to stabilize the forces acting on the tractive vehicle and trailer and prevent fishtailing or sway.

In FIGS. 8, 9, 10 and 11 there is shown a trailer hitch stabilizing and load equalizing mechanism 100 according to a third embodiment of this invention. Mechanism 100 differs from mechanisms 10 and 54 in that the locking means is a solenoid actuated device instead of a mechanical linkage actuated by a jack as in mechanisms 10 and 54.

The mechanism 100 comprises a bracket 102 (similar to bracket 34 of mechanism 10) which is secured to the "A" frame members 104 and 106. A plate 110 is pivotally mounted at 112 to bracket 102 and, similar to plate 32 of mechanism 10, is dimensioned in length to extend beyond "A" frame members 104 and 106 to a point overlying spring bars 114 and 116. Since the mechanism 100 includes a dual, v-shaped, spring bar tethering means of the type disclosed in co-pending U.S. patent application, Ser. No. 133,239, filed Apr. 12, 1971, plate 110 is provided at opposite ends with lateral extensions 118. As best shown in FIG. 9, the chains 120 and 122, constituting the dual v-shaped spring bar tethering means, are each connected at one end by "J" bolts 124 to lateral extension 118 of plate 110 and, at the other end, to the associated spring bar 114 or 116. As in the other mechanisms of this invention herein described, chains 120 and 122 may provide for placing spring bars 114 and 116 under a predetermined flexure to thus achieve a desired load distribution.

To provide for locking and unlocking plate 110 to bracket 102, a bidirectional solenoid 126 is mounted on plate 110. As shown in FIG. 10, plate 110 and bracket 102 are provided with holes 128 and 130, respectively, which holes are adapted to receive therein a core 132 of solenoid 126 when the holes are in register. The solenoid 126 may be of the type manufactured by Ledex Inc. of Dayton, Ohio or be an actuator device Model L1020 manufactured by Nash Controls, Inc. of Caldwell, New Jersey.

As in the other mechanisms 10 and 54, when plate 110 of mechanism 100 is unlocked and is free to pivotally move, spring bars 114 and 116 are rendered inoperative for effecting stabilization. In the unlocked operative connection any axial endwise movement of spring bars 114 and 116 relative to "A" frame members 104 and 106 only results in rotative movement of plate 110 and no increased flexure of spring bars 114 and 116 can occur and no horizontal resistance is effected by the spring bars.

In FIGS. 11, 12 and 13 is shown a trailer hitch stabilizing and load equalizing mechanism 170 according to a fourth embodiment of this invention. This mechanism 170 is applicable to the spring bar assemblies such as disclosed in the U.S. Pat. to Reese, No. 3,194,584.

The spring bar assemblies disclosed in the aforesaid patent comprise, as best illustrated in FIG. 11, an arm 172 which is pivotally supported at one end by a saddle or bracket 174 mounted to "A" frame member 176 and, at the opposite end, supported by a tether, such as a chain 178. The chain 178 is connected to "A" frame member 176 via a bracket 180. The arm 172 has a camming knuckle 182 which engages a cam plate 184 secured to the distal end portion of a spring bar 186. This spring bar assembly functions to cause horizontal resistance and flexure of spring bar 186 when axial endwise movement of the spring bar relative to "A" frame member 176 occurs and cam plate 184 is thereby caused to ride up upon camming knuckle 182. If cam plate 184 is prevented from riding on camming knuckle 182, the spring bars would not offer horizontal resistance and thus the spring bars would be rendered inoperative with regard to their stabilizing function. Therefore, in accordance with the present invention, saddle 174 is slidably mounted on "A" frame member and a locking means 188 is provided for selectively anchoring saddle 174 to "A" frame member 176 and releasing the saddle for movement relative to the "A" frame member.

The locking means 188 comprises a locking bar 190 which is supported at opposite ends in guide slots 192 in locking brackets 194 (only one of which is shown in the drawings), each of the brackets 194 being secured to the adjacent "A" frame member 176. A locking plate 196 is secured at one end, as by welding, bolting or the like, to each saddle 174 so as to extend adjacent locking brackets 194. Each locking plate 196 has a notch 198 therein disposed in register with the guide slot 192 in the adjacent locking bracket 194.

To provide for movement of locking bar 190 in slots 192 and into and out of notches 198, a camming collar 200 is secured on the telescopically extensile and retractile post 202 of a jack 204. The jack 204 is mounted on a bracket 206 (similar to brackets 34 and 102) which straddle and are secured to "A" frame members 176. The jack may be powered by a suitable motor, such as an electric, pneumatic or hydraulic motor.

In operation of mechanism 170 with the locking bar 190 held by camming collar 200 in notches 198, saddle 174 is held against movement relative to "A" frame member 176. Any force exerted on saddle 174, via arm 172 as a result of cam plate 184 engaging and riding upon camming knuckle 182 and tending to slide the latter on "A" frame member 176, is transmitted to locking plate 196. However, locking plate 196 is prevented from moving by locking bar 190 which is held in notch 198 of the locking bar by camming collar 200. Thus, saddle 174 is held against movement and spring bars 186 can be caused to transmit a horizontal force to the "A" frame as they are cammed upwardly by the coaction of cam plate 184 and camming knuckle 182.

When it is desired to render the spring bars 186 inoperative as to stabilization and, therefore, release saddles 174 for slidable movement on "A" frame members 176, a control switch or valve (not shown), located at a remote point, such as the instrument panel of the tractive vehicle (not shown), is moved to cause post 202 of jack 204 to extend in a downward direction as viewed in the drawings. The movement of post 202 carries camming collar 200 downwardly thereby allowing locking bar 190 to drop in slots 192 and out of notches 198. With locking bar 190 out of engagement with notches 198, the saddles are unlocked and released for slidable movement on "A" frame members 176, thus preventing cam plate 184 from riding up on camming knuckle 182 and the transmission of horizontal forces on the "A" frame through the spring bars.

It is believed now readily apparent that the present invention provides a novel trailer hitch stabilizing mechanism which is capable of being selectively made operative or inoperative from a point remote from the trailer hitch. It is a mechanism which minimizes the strain on the frames of the tractive vehicle and trailer as well as minimizing wear on the tires of the vehicles. It is a mechanism which increases the maneuverability of the tractive vehicle and trailer, particularly at low speeds and in a reverse or backup direction of travel.

Although several embodiments of the invention have been illustrated and described in detail, it is to be expressly understood that the invention is not limited thereto. Various changes can be made in the arrangement of parts in each of the embodiments without departing from the scope and spirit of the invention as the same will now be understood by those skilled in the art.

What is claimed is:

1. In combination with a trailer hitch for flexibly connecting the frame of a tractive vehicle to the frame of a trailer, a trailer hitch stabilizing mechanism comprising:
   a. a resistance means connected to the frame of the tractive vehicle and extending adjacent the frame of the trailer;
   b. connecting means connecting the resistance means to said trailer frame so that upon movement of the tractive vehicle and trailer out of the straight in-line direction of travel the resistance means exerts a horizontal force on the trailer and tractive vehicle resisting such movement;
   c. locking means coacting with said connecting means in one operative position to render the resistance means capable of exerting said horizontal force to effect stabilization and in another operative position render the resistance means incapable of exerting said horizontal force upon movement of the tractive vehicle and trailer out of the straight in-line direction of travel.

2. The apparatus of claim 1 wherein said resistance means is an elongated bar pivotally connected at one end to the tractive vehicle.

3. The apparatus of claim 2 wherein said elongated bar is a spring bar subject to flexure upon endwise axial moement thereof relative to the trailer frame.

4. The apparatus of claim 2 wherein said connecting means includes a pivotal plate and said locking means includes a stop means operative in one position to engage said plate and prevent its pivotal movement and operative in another position to release said plate for pivotal movement.

5. The apparatus of claim 4 wherein said connecting means includes at least one tethering means secured to the elongated bar and to said pivotal plate.

6. The apparatus of claim 2 wherein said locking means includes a bracket secured to the trailer frame and said connecting means includes a plate pivotally mounted on the bracket, said locking means also including a stop pin carried by the bracket and movable to a position to prevent pivotal movement of said plate and to another position releasing said plate for pivotal movement.

7. The apparatus of claim 6 wherein a jack having a reciprocable post is supported by said bracket and wherein a linkage means is provided for interconnecting the post with the stop pin so that reciprocable movement of said post effects movement of the stop pin to said positions preventing and allowing pivotal movement of said plate.

8. The apparatus of claim 6 wherein said stop pin is the core of a bidirectional linear solenoid which core is dimensioned in one position to extend through registered holes in said plate and bracket and in another position be out of the one of the registered holes and thereby release the plate for pivotal movement.

9. The apparatus of claim 1 wherein said locking means is a bidirectional solenoid.

10. The apparatus of claim 1 wherein said locking means is a stop means and wherein a jack means having a telescopically extensile and retractile post is provided to engage and actuate said stop means to the said one operative position and said other operative position.

11. The apparatus of claim 10 wherein a control means for effecting reciprocation of the post of said jack is located at a point remote from the jack.

12. The apparatus of claim 1 wherein said resistance means includes a pair of elongated bars and a connecting means is provided for each elongated bar.

13. The apparatus of claim 1 wherein a control means is located remotely from and is connected to the locking means to actuate said locking means to said one or said other operative position.

14. The apparatus of claim 1 wherein said connecting means includes a bracket mounted on the trailer frame for movement relative to the latter and wherein said locking means includes stop means for engaging said bracket and trailer frame and thereby preventing movement of said bracket relative to the trailer frame.

15. The apparatus of claim 14 wherein said stop means is an actuator having a reciprocable pin and the bracket and trailer frame have means which coact with said pin to prevent movement of the bracket.

16. The apparatus of claim 14 wherein said stop means is an electrically operated jack which has a reciprocable post and wherein said stop means is a rod connected by the post to be moved upon reciprocation of the post into and out of positions of engagement and disengagement with the bracket and trailer frame.

17. The apparatus of claim 16 wherein a control means for effecting actuation of the jack is located at a point remote from the jack and the connecting means.

18. The apparatus of claim 1 wherein said resistance means comprises two spring bars each of which is pivotally connected at one end to the tractive vehicle and said connecting means includes a plate pivotally mounted on the trailer frame and the opposite end portions of which are connected to the distal end portions of the spring bars.

* * * * *